US012300939B2

(12) United States Patent
Maesoba et al.

(10) Patent No.: US 12,300,939 B2
(45) **Date of Patent: *May 13, 2025**

(54) SHIELD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Mie (JP); Toshifumi Ichio, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 345 days.

This patent is subject to a terminal disclaimer.

(21) Appl. No.: 17/792,032

(22) PCT Filed: Dec. 25, 2020

(86) PCT No.: PCT/JP2020/048635
§ 371 (c)(1),
(2) Date: Jul. 11, 2022

(87) PCT Pub. No.: WO2021/145196
PCT Pub. Date: Jul. 22, 2021

(65) Prior Publication Data
US 2023/0037383 A1 Feb. 9, 2023

(30) Foreign Application Priority Data
Jan. 15, 2020 (JP) ................................ 2020-004086

(51) Int. Cl.
*H01R 13/658* (2011.01)
*H01R 13/24* (2006.01)
(Continued)

(52) U.S. Cl.
CPC ..... *H01R 13/6582* (2013.01); *H01R 13/2407* (2013.01); *H01R 13/4223* (2013.01); *H01R 13/502* (2013.01); *H01R 43/16* (2013.01)

(58) Field of Classification Search
CPC ........... H01R 13/6582; H01R 13/2407; H01R 13/4223; H01R 13/502; H01R 43/16; H01R 4/183; H01R 13/6593; H01R 13/506
(Continued)

(56) References Cited

U.S. PATENT DOCUMENTS 5,681,187 A * 10/1997 Fukushima .......... H01R 13/187 439/138
8,444,439 B2 * 5/2013 Cao ...................... H01R 13/518 439/108
(Continued)

FOREIGN PATENT DOCUMENTS

CN 2699531 Y 5/2005

OTHER PUBLICATIONS

International Search Report issued on Mar. 2, 2021 for WO 2021/145196 A1 (4 pages).

*Primary Examiner* — Alexander Gilman
(74) *Attorney, Agent, or Firm* — Venjuris, P.C.

(57) ABSTRACT

It is aimed to reduce friction resistance generated in a resilient contact portion. A shield connector is provided with a dielectric for accommodating an inner conductor, a tubular outer conductor for surrounding the dielectric, a resilient contact portion formed in the outer conductor, and a cut portion formed in the outer conductor and enabling a sup- (Continued)

porting portion supporting the resilient contact portion, out of the outer conductor, to be resiliently deformed. If the resilient contact portion contacts a mating outer conductor and is resiliently deformed, the supporting portion supporting the resilient contact portion is resiliently deformed by a reaction force from the mating outer conductor. Since a resilient deformation amount of the resilient contact portion is reduced by as much as the supporting portion is resiliently deformed, friction resistance generated in the resilient contact portion is reduced.

6 Claims, 6 Drawing Sheets

(51) Int. Cl.
*H01R 13/422* (2006.01)
*H01R 13/502* (2006.01)
*H01R 13/6582* (2011.01)
*H01R 43/16* (2006.01)

(58) Field of Classification Search
USPC .......................................................... 439/607
See application file for complete search history.

(56) References Cited

U.S. PATENT DOCUMENTS 9,490,581 B2* 11/2016 Ng ........................ H01R 13/646
9,502,826 B1* 11/2016 Young ................ H01R 13/6583
10,594,057 B2* 3/2020 Kanemura ............. H01R 43/16
10,644,416 B2* 5/2020 Kanemura ......... H01R 13/4362
10,923,861 B2* 2/2021 Messuri ............. H01R 13/6582
12,088,041 B2* 9/2024 Demaratos ............. F16J 15/025
2002/0142636 A1* 10/2002 Murr .................. H01R 13/6582 439/108
2003/0194918 A1* 10/2003 Fricke .................... H01R 4/484 439/835
2005/0221680 A1* 10/2005 Yasumura .......... H01R 13/2407 439/676
2005/0255735 A1* 11/2005 Ward ................... H01R 13/506 439/352
2006/0172600 A1* 8/2006 Sakakura ......... H01R 13/62938 439/607.57
2006/0172602 A1* 8/2006 Sakakura ........... H01R 13/6593 439/607.52
2008/0274654 A1* 11/2008 Yasumura .............. H01R 12/79 439/862
2009/0029594 A1* 1/2009 Matsuoka .......... H01R 13/5219 439/626
2011/0171855 A1* 7/2011 Fujiwara .............. H01R 9/0518 439/607.41
2011/0230089 A1* 9/2011 Amidon ............... H01R 13/622 29/874
2011/0315442 A1* 12/2011 Nolting .............. H01R 13/5816 174/652
2013/0288523 A1* 10/2013 Il ........................ H01R 13/6581 439/607.01
2014/0011397 A1* 1/2014 Sutter .................... H01R 43/20 29/857
2014/0113486 A1* 4/2014 Wild ...................... H01R 4/183 439/578
2014/0273626 A1* 9/2014 Sparrowhawk .... H01R 13/6593 174/103
2014/0322968 A1* 10/2014 Burris ...................... H01R 9/05 439/578
2015/0082880 A1* 3/2015 Allen ...................... G01F 15/18 73/273
2015/0180183 A1* 6/2015 Watkins ............. H01R 13/6581 439/578
2015/0332809 A1* 11/2015 Natoli ...................... H01R 9/05 29/860
2016/0006145 A1* 1/2016 Goebel ................ H01R 24/525 439/345
2017/0214192 A1* 7/2017 Gibson ................ H01R 24/525
2017/0338600 A1* 11/2017 Tanaka ............... H01R 13/6582
2018/0054017 A1* 2/2018 Watkins ............... H01R 13/502
2018/0109043 A1* 4/2018 Provencher .......... H01R 13/025
2018/0115115 A1* 4/2018 Nakashima ............ H01R 4/184
2018/0138640 A1* 5/2018 Maesoba ................ H01R 24/60
2019/0006785 A1* 1/2019 Maesoba ............ H01R 13/5025
2019/0097359 A1* 3/2019 Goebel ................ H01R 24/525
2019/0199014 A1* 6/2019 Kanemura ........... H01R 13/113
2020/0021064 A1* 1/2020 Maesoba ............ H01R 13/6593
2021/0408702 A1* 12/2021 Blakborn ........... H01R 13/6474
2023/0037383 A1* 2/2023 Maesoba ............ H01R 13/2407
2023/0261423 A1* 8/2023 Maesoba ............ H01R 13/4223 439/607.01

* cited by examiner

SHIELD CONNECTOR

CROSS REFERENCE TO RELATED APPLICATIONS

This application is a national phase of PCT application No. PCT/JP2020/048635, filed on 25 Dec. 2020, which claims priority from Japanese patent application No. 2020-004086, filed on 15 Jan. 2020, all of which are incorporated herein by reference.

TECHNICAL FIELD

The present disclosure relates to a shield connector.

BACKGROUND

Patent Document 1 discloses a shield connector connected to a shielded cable for communication. This shield connector includes a terminal fitting connected to a shield wire of the shielded cable, a housing for accommodating the terminal fitting and a shield shell in the form of a rectangular tube for surrounding the housing.

PRIOR ART DOCUMENT

Patent Document

Patent Document 1: JP 2013-229255 A

SUMMARY OF THE INVENTION

Problems to be Solved

In the shield connector of this type, it is considered to resiliently bring a resilient contact portion formed in the shield shell into contact with a mating shield shell as a connection means for the shield shell and the mating shield shell. However, if the resilient contact portion is formed, friction resistance due to the resilience of the resilient contact portion is generated in the process of fitting the shield shell and the mating shield shell. Thus, there is a concern that fitting resistance of the shield shell and the mating shield shell increases or the resilient contact portion is deformed.

A shield connector of the present disclosure was completed on the basis of the above situation and aims to reduce friction resistance generated in a resilient contact portion.

Means to Solve the Problem

The present disclosure is directed to a shield connector with a dielectric for accommodating an inner conductor, a tubular outer conductor for surrounding the dielectric, a resilient contact portion formed in the outer conductor, and a cut portion formed in the outer conductor, the cut portion enabling a supporting portion supporting the resilient contact portion, out of the outer conductor, to be resiliently deformed.

Effect of the Invention

According to the present disclosure, it is possible to reduce friction resistance generated in a resilient contact portion.

DETAILED DESCRIPTION TO EXECUTE THE INVENTION

Description of Embodiments of Present Disclosure

Figure 1:
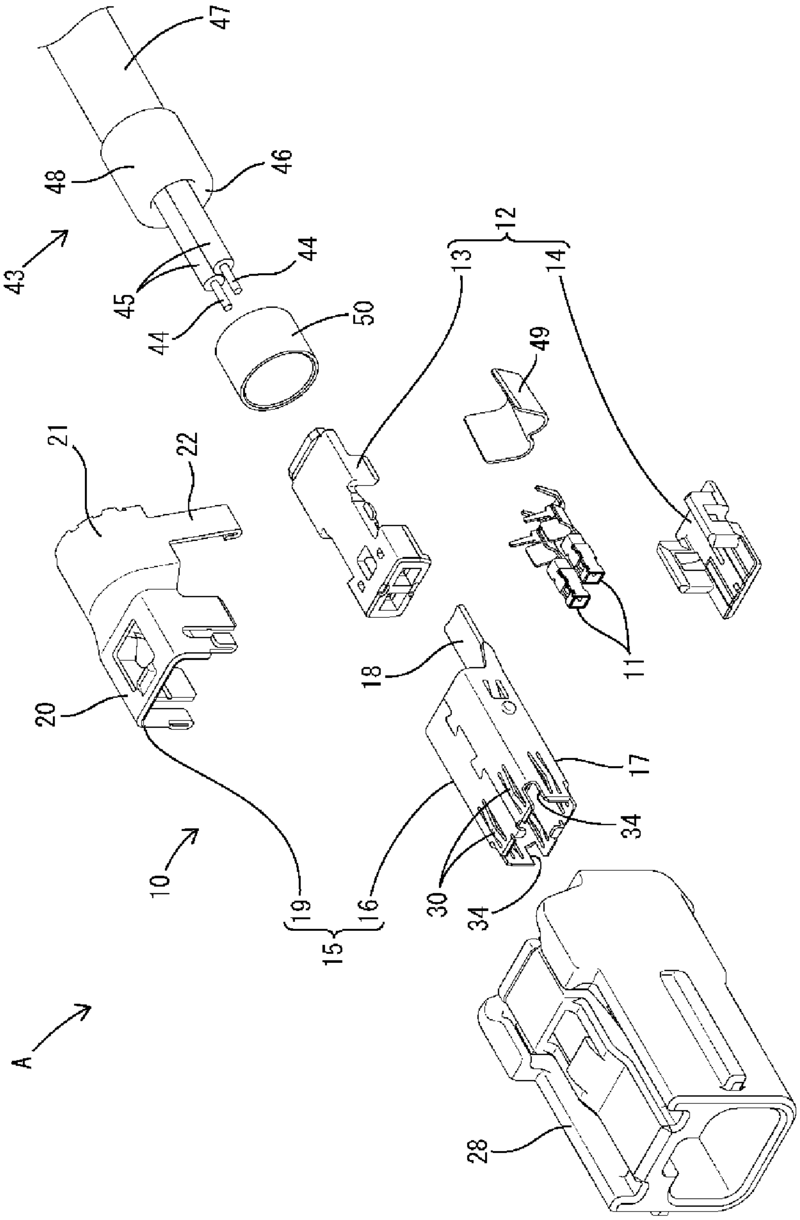
FIG. 1 is an exploded perspective view of a shield connector.
Figure 2:
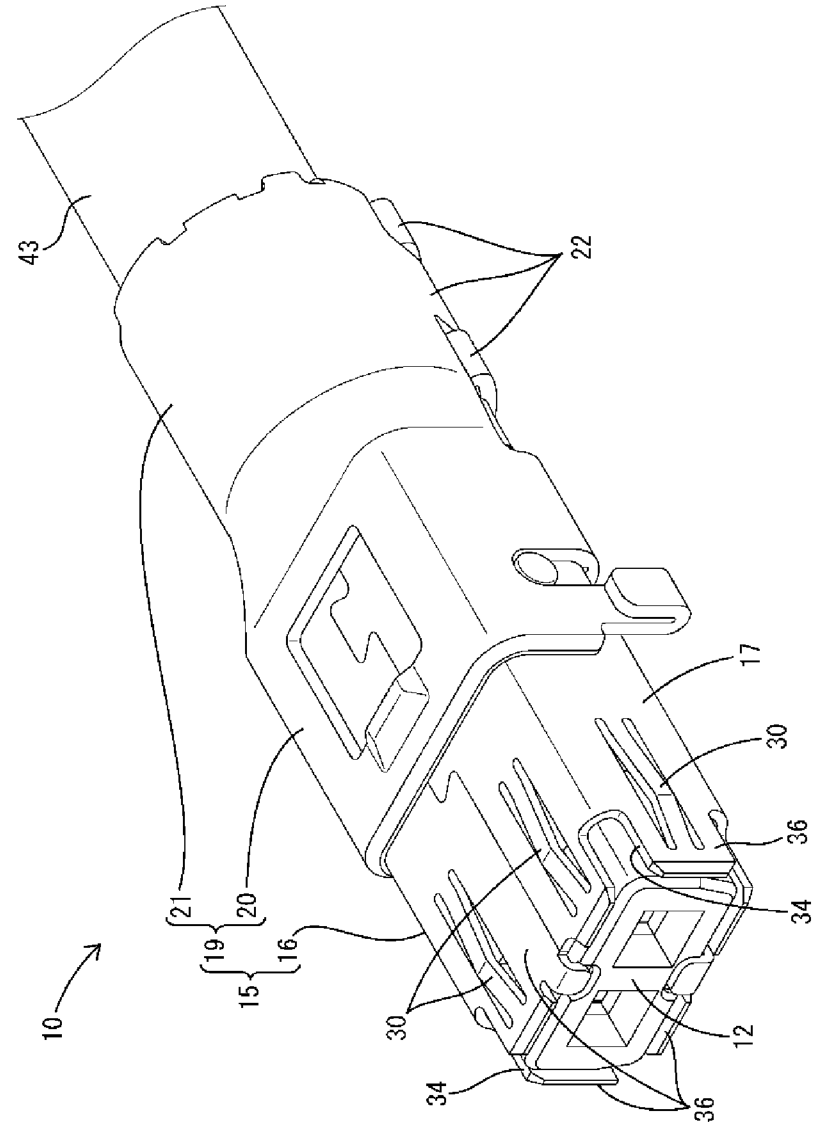
FIG. 2 is a perspective view of a terminal module.

First, embodiments of the present disclosure are listed and described.

(1) The shield connector of the present disclosure is provided with a dielectric for accommodating an inner conductor, a tubular outer conductor for surrounding the dielectric, a resilient contact portion formed in the outer conductor, and a cut portion formed in the outer conductor, the cut portion enabling a supporting portion supporting the resilient contact portion, out of the outer conductor, to be resiliently deformed. According to the configuration of the present disclosure, if the resilient contact portion contacts the mating member and is resiliently deformed, the supporting portion supporting the resilient contact portion is resiliently deformed by a reaction force from the mating member. Since a resilient deformation amount of the resilient contact portion is reduced by as much as the supporting portion is resiliently deformed, friction resistance generated in the resilient contact portion is reduced.

(2) Preferably, the supporting portion is in the form of a rectangular tube having four plate portions in the form of flat plates, the cut portion is in the form of a slit formed by cutting a boundary between the plate portions perpendicular and adjacent to each other, and the resilient contact portion is formed in the plate portion. According to this configuration, if the resilient contact portion is resiliently deformed, the plate portion is deformed. Since the plate portion is in the form of a flat plate and low in flexural rigidity, friction resistance generated between the resilient contact portion and the mating member is suppressed low.

(3) Preferably, in (2), a pair of the cut portions are formed to sandwich the plate portion in a width direction, and the resilient contact portion is symmetrically shaped with respect to a center line in the width direction of the plate portion. According to this configuration, when the resilient contact portion contacts the mating member, the plate portion is not inclined. Thus, a contact state of the resilient contact portion and the mating member is stable.

(4) Preferably, the resilient contact portion is elongated in a front-rear direction in parallel to an axis of the outer conductor and both front and rear end parts thereof are connected to the supporting portion. According to this configuration, if the connection and separation of the resilient contact portion and the mating member are accompanied by relative displacements parallel to the axis of the outer conductor, bucking deformation or rolling-up deformation of the resilient contact portion can be prevented.

(5) Preferably, in (4), the resilient contact portion has a bent shape, a bent part of the resilient contact portion functions as a contact point portion, a length of a front inclined portion forward of the contact point portion, out of the resilient contact portion, is shorter than that of a rear inclined portion rearward of the contact point portion, out of the resilient contact portion, and the cut portion is formed only in a region forward of the contact point portion in the front-rear direction. According to this configuration, the rigidity of the resilient contact portion is higher in the front inclined portion than in the rear inclined portion. However, since only a part of the supporting portion corresponding to the front inclined portion is resiliently deformed when the resilient contact portion is resiliently deformed, a deformation amount of the front inclined portion is suppressed small. In this way, the resilient deformation amount of the resilient contact portion as a whole can be suppressed small.

(6) Preferably, the supporting portion is formed with a slit for enabling resilient deformation of the resilient contact portion, and the entire slit is surrounded by a mating member with the outer conductor fit to the mating member. According to this configuration, it is possible to prevent the leakage of electromagnetic noise to outside through the slit.

(7) Preferably, a plurality of the cut portions are so arranged at intervals in a circumferential direction around an axis of the outer conductor as not to communicate with each other. According to this configuration, in a state where the outer conductor is conductively connected to the mating member to be continuous in parallel to the axis, noise signal flow paths between the outer conductor and the mating member are distributed, wherefore noise signals are easily passed.

Details of Embodiment of Present Disclosure

A specific embodiment of a shield connector A of the present disclosure is described below with reference to FIGS. 1 to 6. Note that the present invention is not limited to these illustrations and is intended to be represented by claims and include all changes in the scope of claims and in the meaning and scope of equivalents. In this embodiment, an oblique left-lower side in FIGS. 1 to 3 and a left side in FIG. 5 are defined as a front side concerning a front-rear direction. Upper and lower sides shown in FIGS. 1 to 6 are directly defined as upper and lower sides concerning a vertical direction. Left and right sides shown in FIG. 4 are directly defined as left and right sides concerning a lateral direction.

A mating terminal module 40 (see FIG. 6) as a connection object of the shield connector A of this embodiment is formed such that mating inner conductors (not shown) are accommodated in a mating dielectric (not shown) and the mating inner conductors and the mating dielectric are surrounded by a mating outer conductor 41. A tubular fitting portion 42 in the form of a rectangular tube is formed in a front end part of the mating outer conductor 41.

As shown in FIG. 1, the shield connector A includes a terminal module 10 connected to an end part of a shielded cable 43 and a housing 28. The shielded cable 43 is configured such that a pair of coated wires 45, in which internal conductors 44 are surrounded by insulation coatings, are collectively surrounded by a shield shell 46 formed of a braided wire, and the shield shell 46 is surrounded by a sheath 47. Front end parts of the pair of coated wires 45 are positioned by a clip 49. A front end part of the shield shell 46 is folded rearward and serves as a folded portion 48 laid on the outer periphery of the sheath 47. A hollow cylindrical sleeve 50 is mounted between the outer periphery of the sheath 47 and the folded portion 48 of the shield shell 46.

As shown in FIG. 1, the terminal module 10 includes a pair of inner conductors 11, a dielectric 12 for accommodating the pair of inner conductors 11 and an outer conductor 15 for surrounding the inner conductors 11 and the dielectric 12. The pair of inner conductors 11 are connected to the pair of internal conductors 44. The dielectric 12 is configured by uniting an accommodating member 13 and a cover member 14. The pair of inner conductors 11 are accommodated in the dielectric 12 while being sandwiched by the accommodating member 13 and the cover member 14.

The outer conductor 15 is configured by assembling a body member 16 and a connecting member 19 including a crimping portion 21 in the form of an open barrel. The body member 16 is formed by applying press-working such as bending and striking to a metal plate material having a predetermined shape. The body member 16 includes a supporting portion 17 in the form of a rectangular tube and a locking portion 18 projecting rearward from the rear end of the supporting portion 17. The connecting member 19 includes a box-shaped fixing portion 20 having an open lower surface and the crimping portion 21 in the form of an open barrel including crimping pieces 22. The fixing portion 20 is fixed to the outer periphery of a rear end part of the supporting portion 17. The crimping portion 21 projects rearward from the rear end of the fixing portion 20. The folded portion 48 of the shield shell 46 is sandwiched between the locking portion 18 and the crimping portion 21, the crimping portion 21 is crimped to the outer periphery of the folded portion 48 and projecting end parts of the crimping pieces 22 are locked to the locking portion 18, whereby the outer conductor 15 and the shield shell 46 are conductively connected.

Figure 3:
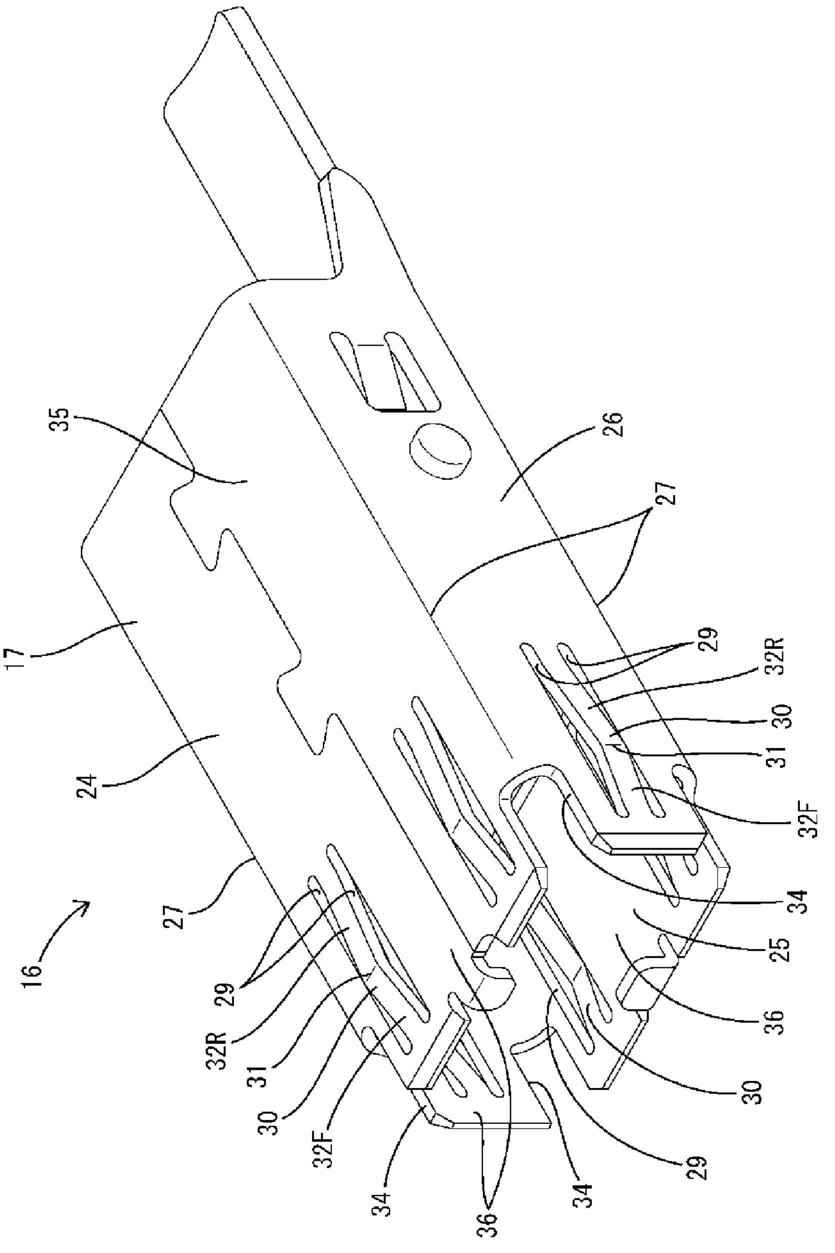
FIG. 3 is a perspective view of an outer conductor.
Figure 4:
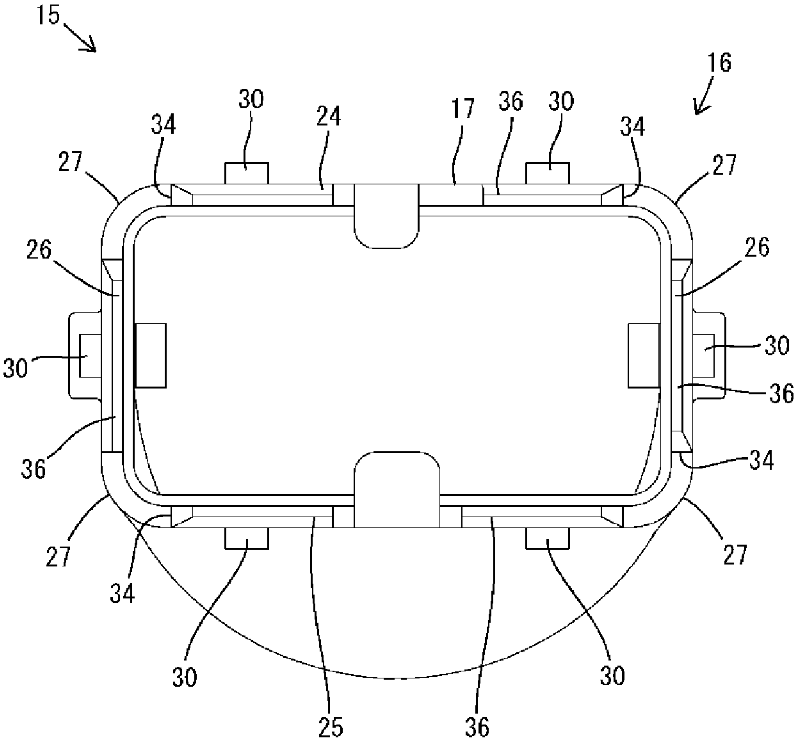
FIG. 4 is a front view of the outer conductor.
Figure 5:
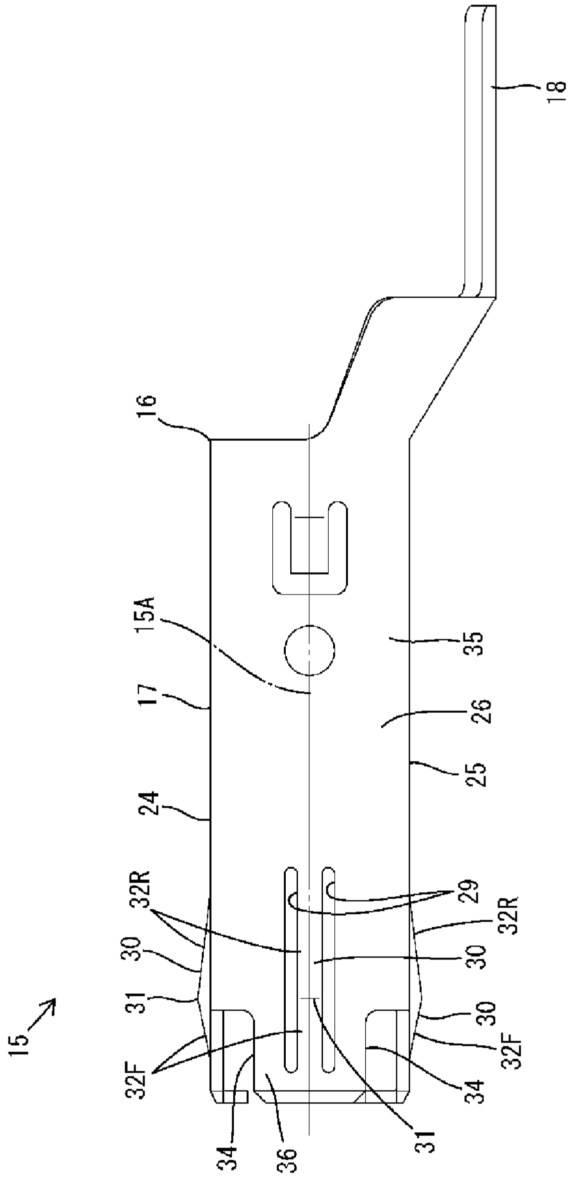
FIG. 5 is a side view of the outer conductor.
Figure 6:
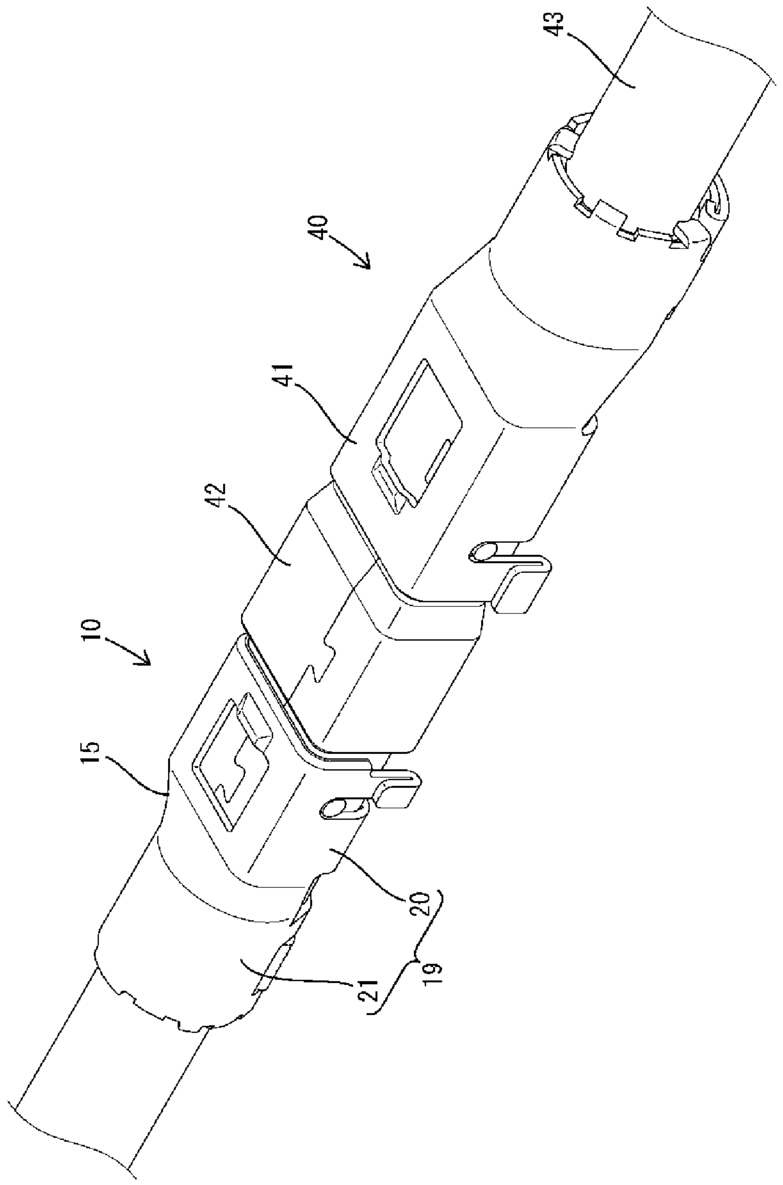
FIG. 6 is a perspective view showing a state where the terminal module is fit to a mating terminal module.

As shown in FIGS. 3 to 5, the supporting portion 17 has an upper plate portion 24, a lower plate portion 25 and a pair of left and right side plate portions 26. Both left and right side edges of the upper plate portion 24 and the upper end edges of the pair of side plate portions 26 are connected at a right angle to form ridge parts, and boundaries 27 (ridge parts) between the upper plate portion 24 and the both side plate portions 26 extend in the front-rear direction. Both left and right side edges of the lower plate portion 25 and the lower end edges of the pair of side plate portions 26 are connected at a right angle to form ridge parts, and boundaries 27 (ridge parts) between the lower plate portion 25 and the both side plate portions 26 extend in the front-rear direction. The locking portion 18 projects rearward from the rear end of the lower plate portion 25.

Out of the supporting portion 17, each of the upper plate portion 24 and the lower plate portion 25 is formed with a pair of bilaterally symmetrical resilient contact portions 30, and each of the both left and right side plate portions 26 is formed with one resilient contact portion 30. Each plate portion 24, 25, 26 is formed with a pair of slits 29 extending in the front-rear direction along both side edges of each resilient contact portion 30. By causing a part between the pair of parallel slits 29, out of each plate portion 24, 25, 26, to project outwardly of the supporting portion 17, the resilient contact portion 30 is formed.

The resilient contact portion 30 has a shape elongated in the front-rear direction in parallel to an axis 15A of the outer conductor 15 as a whole (see FIG. 5). Both front and rear ends (in a longitudinal direction) of the resilient contact portion 30 are connected to each plate portion 24, 25, 26 (forming base of the resilient contact portion 30). That is, the resilient contact portion 30 is supported on each plate portion 24, 25, 26 on both front and rear ends. When viewed from a direction parallel to the outer surface of each plate portion 24, 25, 26 and perpendicular to the slits 29, the resilient contact portion 30 is bent into a chevron shape. A bent part corresponding to a top part of the chevron shape, out of the resilient contact portion 30, serves as a contact point portion 31 to be brought into contact with the inner peripheral surface of the tubular fitting portion 42 of the mating outer conductor 41.

A part of the resilient contact portion 30 from the front end to the contact point portion 31 serves as a front inclined portion 32F. A part of the resilient contact portion 30 from the contact point portion 31 to the rear end serves as a rear inclined portion 32R. A front-rear length of the front inclined portion 32F is shorter than that of the rear inclined portion 32R. An angle of inclination of the front inclined portion 32F with respect to the outer surface of each plate portion 24, 25, 26 is larger than that of the rear inclined portion 32R with respect to the outer surface of each plate portion 24, 25, 26.

All the six resilient contact portions 30 have the same front-rear length. All the six resilient contact portions 30 also have the same width. All the six resilient contact portions 30 are located at the same position in the front-rear direction, and arranged in a region forward of a center in the front-rear direction of the supporting portion 17. The resilient contact portions 30 are symmetric with respect to widthwise center lines (not shown) of the respective plate portions 24, 25 and 26. In the upper plate portion 24 and the lower plate portion 25, a pair of the resilient contact portions 30 are symmetrically arranged with respect to a center line in the lateral direction. In the respective left and right side plate portions 26, a center line in the vertical direction of each side plate portion 26 and a center line in the vertical direction (width direction) of one resilient contact portion 30 coincide.

In connecting the outer conductor 15 and the mating outer conductor 41, the supporting portion 17 is fit into the tubular fitting portion 42 and the contact point portions 31 of the six resilient contact portions 30 are resiliently brought into contact with the inner peripheral surface of the tubular fitting portion 42. Since the resilient contact portions 30 are resiliently deformed when the contact point portions 31 resiliently contact the tubular fitting portion 42, friction resistance due to resilient restoring forces of the resilient contact portions 30 is generated between the inner peripheral surface of the tubular fitting portion 42 and the contact point portions 31. As a means for reducing the friction resistance generated in the resilient contact portions 30, the supporting portion 17 is formed with four cut portions 34.

The four cut portions 34 are in the form of grooves cut rearward from the front end of the supporting portion 17, and penetrate through the outer and inner surfaces of the supporting portion 17. The front ends of the cut portions 34 are open on the front end of the supporting portion 17. Each cut portion 34 is formed along the boundary 27 between two plate portions (upper plate portion 24 and side plate portion 26, lower plate portion 25 and side plate portion 26) perpendicular and adjacent to each other. The cut portions 34 are formed at all the four boundaries 27 constituting the supporting portion 17. The cut portions 34 are formed only at the boundaries 27 in the supporting portion 17. The cut portions 34 are not formed in regions (widthwise central parts of the respective plate portions 24, 25 and 26) other than the boundaries 27, out of the supporting portion 17.

The cut portions 34 are formed only in a region forward of the contact point portions 31 of the resilient contact portions 30 in the front-rear direction. A region of the supporting portion 17 rearward of the rear ends of the cut portions 34 serves as a non-deformable portion 35. Since the four plate portions 24, 25 and 26 are connected over the entire periphery in the non-deformable portion 35, the non-deformable portion 35 is hardly deformed in a plate thickness direction of each plate portion 24, 25, 26. A region of each plate portion 24, 25, 26 corresponding to the cut portions 34 in the front-rear direction, i.e. a flat plate-like region from the rear ends of the cut portions 34 to the front end of the supporting portion 17 (each plate portion 24, 25, 26), functions as a movable portion 36. Each movable portion 36 is in the form of a flat plate and separated from the other movable portions 36 via the cut portions 34. Therefore, the movable portion 36 can be resiliently deformed in a plate thickness direction of the movable portion 36 (plate portion 24, 25, 26) with the rear end of the movable portion 36 as a fulcrum.

Next, functions and effects of this embodiment are described. The shield connector A of this embodiment includes the terminal module 10 having the dielectric 12 for accommodating the inner conductors 11, the tubular outer conductor 15 for surrounding the dielectric 12 and the resilient contact portions 30 formed in the outer conductor 15. The outer conductor 15 is formed with the cut portions 34. The cut portions 34 enable the supporting portion 17 supporting the resilient contact portions 30, out of the outer conductor 15, to be resiliently deformed. If the terminal module 10 is connected to the mating terminal module 40, the inner conductors 11 and the mating inner conductors are conductively connected, the supporting portion 17 of the outer conductor 15 enters the tubular fitting portion 42 of the mating outer conductor 41 and the outer conductor 15 and the mating outer conductor 41 are conductively connected.

In the process of connecting the outer conductor 15 and the mating outer conductor 41, the six resilient contact portions 30 slide in contact with the inner peripheral surface of the tubular fitting portion 42 while being resiliently deformed, and friction resistance due to resilient restoring forces of the resilient contact portions 30 is generated between the contact point portions 31 and the inner peripheral surface of the tubular fitting portion 42. At this time, a reaction force from the side of the hardly deformed tubular fitting portion 42 acts on each plate portion 24, 25, 26 of the supporting portion 17 via the resilient contact portions 30. By the action of this reaction force, the movable portions 36 corresponding to the formation region of the cut portions 34 in the front-rear direction, out of the respective plate portions 24, 25 and 26 supporting the resilient contact portions 30, are resiliently deformed in the plate thickness directions in conjunction with the resilient deformation of the resilient contact portions 30. Since resilient deformation amounts of the resilient contact portions 30 are reduced by as much as the movable portions 36 are resiliently deformed, the friction resistance generated between the contact point portions 31 and the tubular fitting portion 42 is also reduced.

The supporting portion 17 is in the form of a rectangular tube having the four plate portions 24, 25 and 26 in the form of flat plates. The resilient contact portions 30 are formed in these four plate portions 24, 25 and 26. The cut portions 34 are in the form of grooves formed by cutting the boundaries 27 between the plate portions 24, 25 and 26 perpendicular and adjacent to each other. According to this configuration, if the resilient contact portions 30 are resiliently deformed, the movable portions 36 of the plate portions 24, 25 and 26 are resiliently deformed. Since the plate portions 24, 25 and 26 (movable portions 36) are in the form of flat plates and low in flexural rigidity, friction resistance generated between the resilient contact portions 30 and the tubular fitting portion 42 of the mating outer conductor 41 is suppressed low.

A pair of the cut portions 34 laterally spaced apart are formed to sandwich each plate portion 24, 25, 26 in the width direction. The resilient contact portions 30 are symmetrically shaped with respect to the widthwise center lines of the plate portions 24, 25 and 26. According to this configuration, when the resilient contact portions 30 contact the mating outer conductor 41, the plate portions 24, 25 and 26 are not inclined. Thus, a contact state of the resilient contact portions 30 and the mating outer conductor 41 is stable.

Since the connection and separation of the resilient contact portions 30 and the mating outer conductor 41 are accompanied by relative displacements parallel to the axis 15A of the outer conductor 15, there is a concern for buckling deformation or rolling-up deformation of the resilient contact portions 30. However, since the resilient contact portions 30 of this embodiment are elongated in the front-rear direction in parallel to the axis 15A of the outer conductor 15 and both front and rear end parts of the resilient contact portions 30 are connected to the supporting portion 17, buckling deformation or rolling-up deformation of the resilient contact portions 30 can be prevented.

The resilient contact portion 30 is bent into a chevron shape and the bent part of the resilient contact portion 30 functions as the contact point portion 31. A length of the front inclined portion 32F forward of the contact point portion 31, out of the resilient contact portion 30, is shorter than that of the rear inclined portion 32R rearward of the contact point portion 31, out of the resilient contact portion 30. The cut portions 34 are formed only in the region forward of the contact point portions 31 in the front-rear direction. The rigidity of the resilient contact portion 30 is higher in the front inclined portion 32F than in the rear inclined portion 32R. When the resilient contact portions 30 are resiliently deformed, parts (parts other than the movable portions 36) of the supporting portion 17 corresponding to the rear inclined portions 32R are not resiliently deformed and only the movable portions 36 corresponding to the front inclined portions 32F are resiliently deformed. In this way, a deformation amount of the front inclined portion 32F is suppressed small and a resilient deformation amount of the resilient contact portion 30 as a whole can be suppressed small.

The supporting portion 17 is formed with the slits 29 for enabling the resilient deformation of the resilient contact portions 30. With the outer conductor 15 fit to the mating outer conductor 41, the entire slits 29 are surrounded by the tubular fitting portion 42 of the mating outer conductor 41. According to this configuration, it is possible to prevent the leakage of electromagnetic noise to the outside of the outer conductor 15 through the slits 29.

The outer conductor 15 is conductively connected to the mating outer conductor 41 to be continuous in the front-rear direction in parallel to the axis 15A of the outer conductor 15. Accordingly, the plurality of cut portions 34 for resiliently deforming the supporting portion 17 are so arranged at intervals in a circumferential direction around the axis 15A of the outer conductor 15 as not to communicate with each other. Further, the plurality of slits 29 for forming the resilient contact portions 30 are also so arranged at intervals in the circumferential direction around the axis 15A of the outer conductor 15 as not to communicate with each other. The cut portions 34 and the slits 29 also do not communicate with each other in the circumferential direction.

According to this configuration, noise signal flow paths in the front-rear direction between the outer conductor 15 and the mating outer conductor 41 are formed between the cut portions 34, between the slits 29 and between the cut portions 34 and the slits 29 adjacent to each other in the circumferential direction, out of the supporting portion 17.

Thus, noise signals are easily passed. Further, since a plurality of the noise signal flow paths are distributed, noise signals are more easily passed.

Other Embodiments

The present invention is not limited to the above described and illustrated embodiment and is represented by claims. The present invention is intended to include all changes in the scope of claims and in the meaning and scope of equivalents and also include the following embodiments.

Although the supporting portion of the outer conductor is in the form of a rectangular tube in the above embodiment, the supporting portion may have a hollow cylindrical shape.

Although the front end of the cut portion is open on the front end of the supporting portion in the above embodiment, both front and rear ends of the cut portion may be closed without being open on the outer edge of the supporting portion.

Although the cut portion is formed along the boundary between two plate portions perpendicular and adjacent to each other in the above embodiment, the cut portion may be formed at a position of the plate portion separated from the boundary.

Although the cut portions are formed at all the four boundaries in the above embodiment, the cut portion(s) may be formed at only some of the four boundaries.

Although the cut portions are formed only at the boundaries in the above embodiment, the cut portions may be formed at the boundaries and at positions of the plate portions separated from the boundaries.

Although the resilient contact portions are symmetrically shaped with respect to the widthwise center lines of the plate portions in the above embodiment, the resilient contact portions may be asymmetrically shaped with respect to the widthwise center lines of the plate portions.

Although the resilient contact portion is supported on both ends by having both ends in the longitudinal direction connected to the supporting portion in the above embodiment, the resilient contact portion may be cantilevered by having only one end part in the longitudinal direction connected to the supporting portion. In this case, only the front end of the resilient contact portion may be connected to the supporting portion or only the rear end of the resilient contact portion may be connected to the supporting portion.

Although the resilient contact portion has an elongated shape in parallel to the axis of the outer conductor in the above embodiment, the resilient contact portion may have an elongated shape in the circumferential direction around the axis of the outer conductor.

Although the cut portions are formed only in the region forward of the contact point portions in the above embodiment, the cut portions may be formed over the region rearward of the contact point portions. In other words, the cut portions may be formed in both a region corresponding to the entire front inclined portions and a region corresponding to only front end parts of the rear inclined portions or may be formed from the front ends to the rear ends of the resilient contact portions over entire lengths.

Although the resilient contact portion is integrally formed to the supporting portion in the above embodiment, the resilient contact portion may be a component separate from the supporting portion and fixed to the supporting portion. In this case, the supporting portion may not be formed with a slit for enabling the resilient deformation of the resilient contact portion.

LIST OF REFERENCE NUMERALS

A . . . shield connector
10 . . . terminal module
11 . . . inner conductor
12 . . . dielectric
13 . . . accommodating member
14 . . . cover member
15 . . . outer conductor
15A . . . axis of outer conductor
16 . . . body member
17 . . . supporting portion
18 . . . locking portion
19 . . . connecting member
20 . . . fixing portion
21 . . . crimping portion
22 . . . crimping piece
24 . . . upper plate portion
25 . . . lower plate portion
26 . . . side plate portion
27 . . . boundary
28 . . . housing
29 . . . slit
30 . . . resilient contact portion
31 . . . contact point portion
32F . . . front inclined portion
32R . . . rear inclined portion
34 . . . cut portion
35 . . . non-deformable portion
36 . . . movable portion
40 . . . mating terminal module
41 . . . mating outer conductor (mating member)
42 . . . tubular fitting portion
43 . . . shielded cable
44 . . . internal conductor
45 . . . insulation coating
46 . . . shield layer
47 . . . sheath
48 . . . folded portion
49 . . . clip
50 . . . sleeve

What is claimed is:

1. A shield connector, comprising:
a dielectric for accommodating an inner conductor;
an outer conductor having a tubular shape surrounding the dielectric;
a resilient contact portion formed in the outer conductor;
a supporting portion formed out of the outer conductor and configured to support the resilient contact portion; and
a cut portion formed in the outer conductor and configured to enable the supporting portion to be resiliently deformed,
wherein:
the supporting portion is in the form of a rectangular tube having four plate portions in the form of flat plates,
the cut portion is in the form of a slit formed by cutting a boundary between the plate portions perpendicular and adjacent to each other,
the resilient contact portion is formed in at least one of the plate portions and projects outwardly of the supporting portion, and
the supporting portion is resiliently deformed as the resilient contact portion is resiliently deformed.

2. The shield connector according to claim 1, wherein:
the cut portion includes a pair of cut portions formed to sandwich the plate portion in a width direction, and
the resilient contact portion is symmetrically shaped with respect to a widthwise center line of a corresponding one of the plate portions.

3. The shield connector according to claim 1, wherein the resilient contact portion is elongated in a front-rear direction in parallel to an axis of the outer conductor and both front and rear end parts thereof are connected to the supporting portion.

4. The shield connector according to claim 1, wherein:
the cut portion includes a plurality of cut portions arranged at intervals in a circumferential direction around an axis of the outer conductor as not to communicate with each other.

5. A shield connector, comprising:
a dielectric for accommodating an inner conductor;
an outer conductor having a tubular shape surrounding the dielectric;
a resilient contact portion formed in the outer conductor;
a supporting portion formed out of the outer conductor and configured to support the resilient contact portion; and
a cut portion formed in the outer conductor and configured to enable the supporting portion to be resiliently deformed,
wherein:
the resilient contact portion is elongated in a front-rear direction in parallel to an axis of the outer conductor and both front and rear end parts thereof are connected to the supporting portion,
the resilient contact portion is bent into a chevron shape,
a bent part of the resilient contact portion functions as a contact point portion,
a part of the resilient contact portion from a front end of the resilient contact portion to the contact point portion is a front inclined portion that projects outwardly of the supporting portion, and
a part of the resilient contact portion from the contact point portion to a rear end of the resilient contact portion is a rear inclined portion that projects outwardly of the supporting portion,
a length of the front inclined portion is shorter than that of the rear inclined portion,
the front inclined portion is higher in rigidity than the rear inclined portion, and
the cut portion is formed only in a region forward of the contact point portion in the front-rear direction.

6. A shield connector, comprising:
a dielectric for accommodating an inner conductor;
an outer conductor having a tubular shape surrounding the dielectric;
a resilient contact portion formed in the outer conductor;
a supporting portion formed out of the outer conductor and configured to support the resilient contact portion; and
a cut portion formed in the outer conductor and configured to enable the supporting portion to be resiliently deformed,
wherein:
a pair of slits extending in a front-rear direction are formed in a plate portion constituting the supporting portion, the resilient contact portion is formed by a part of the plate portion between the pair of slits, and the slits are entirely surrounded by a mating member (40) with the outer conductor fit to the mating member.

* * * * *